United States Patent
Russ et al.

(10) Patent No.: US 12,105,202 B2
(45) Date of Patent: Oct. 1, 2024

(54) OPTOELECTRONIC SENSOR AND METHOD OF DETECTING OBJECTS

(71) Applicant: SICK AG, Waldkirch (DE)

(72) Inventors: Thomas Russ, Waldkirch (DE); Sebastian Tschuch, Waldkirch (DE); Romain Müller, Waldkirch (DE)

(73) Assignee: SICK AG, Waldkirch (DE)

( * ) Notice: Subject to any disclaimer, the term of this patent is extended or adjusted under 35 U.S.C. 154(b) by 1016 days.

(21) Appl. No.: 17/076,187

(22) Filed: Oct. 21, 2020

(65) Prior Publication Data
US 2021/0141094 A1 May 13, 2021

(30) Foreign Application Priority Data
Nov. 7, 2019 (DE) .......................... 102019129986.1

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4817* (2013.01); *G01S 7/497* (2013.01); *G01S 17/08* (2013.01);
(Continued)

(58) Field of Classification Search
CPC ...... G01S 17/894; G01S 7/4817; G01S 7/497; G01S 17/08; G01S 7/42; G01S 17/86;
(Continued)

(56) References Cited

U.S. PATENT DOCUMENTS

| | | |
|---|---|---|
| 8,767,190 B2 | 7/2014 | Hall |
| 2010/0174507 A1 | 7/2010 | Vogel et al. |

(Continued)

FOREIGN PATENT DOCUMENTS

| | | |
|---|---|---|
| CN | 105678783 B | 10/2018 |
| DE | 202006014939 U1 | 1/2007 |

(Continued)

OTHER PUBLICATIONS

Translation of description of Sick AG (DE 202011052106). created Oct. 19, 2023, 37 pages. (Year: 2023).*

(Continued)

*Primary Examiner* — Daniel L Murphy
(74) *Attorney, Agent, or Firm* — Nath, Goldberg & Meyer; Jerald L. Meyer; Morgan D. Rosenberg (57) ABSTRACT

An optoelectronic sensor for detecting objects in a monitored zone is provided, wherein the sensor comprises a laser scanner having a deflection unit rotatable about an axis of rotation for scanning the monitored zone with at least one scanning beam; a first distance measurement unit for determining 3D measurement points of the respective objects impacted by the scanning beam using a time-of-flight method; a panorama camera having a panorama optics and having an image sensor with a plurality of light reception elements for detecting picture elements; and a control and evaluation unit that is configured to fuse the 3D measurement points and the picture elements. In this respect, the optical axis of the panorama camera and the rotation axis coincide.

20 Claims, 4 Drawing Sheets

(51) Int. Cl.
  *G01S 7/497* (2006.01)
  *G01S 17/08* (2006.01)
  *H04N 23/695* (2023.01)
  *H04N 23/698* (2023.01)
(52) U.S. Cl.
  CPC ......... *H04N 23/695* (2023.01); *H04N 23/698* (2023.01)
(58) Field of Classification Search
  CPC .. G01S 17/89; H04N 5/23299; H04N 23/695; H04N 23/698; H04N 7/183; G08B 13/19602; G08B 29/188; G08B 29/24
  USPC ....................................................... 356/4.01
  See application file for complete search history.

(56) References Cited

U.S. PATENT DOCUMENTS

| | | | |
|---|---|---|---|
| 2010/0207936 | A1 | 8/2010 | Minear et al. |
| 2013/0335595 | A1 | 12/2013 | Lee et al. |
| 2016/0070981 | A1 | 3/2016 | Sasaki et al. |
| 2016/0266256 | A1 | 9/2016 | Allen et al. |
| 2017/0289524 | A1 | 10/2017 | Pacala et al. |
| 2018/0139431 | A1 | 5/2018 | Simek et al. |

FOREIGN PATENT DOCUMENTS

| | | | |
|---|---|---|---|
| DE | 102008032216 A1 | 1/2010 | |
| DE | 202011052106 U1 | 2/2012 | |
| DE | 102017109039 A1 | 10/2018 | |
| EP | 1965225 A2 | 9/2008 | |
| EP | 2354806 B1 | 5/2012 | |
| GB | 2507560 A8 | 5/2014 | |
| JP | 2008-281427 A | 11/2008 | |
| JP | 2017-125790 A | 7/2017 | |
| WO | 2012/038601 A1 | 3/2012 | |
| WO | 2015/036592 A1 | 3/2015 | |
| WO | 2016/016284 A1 | 2/2016 | |
| WO | 2017/174579 A1 | 10/2017 | |
| WO | 2018/073379 A1 | 4/2018 | |

OTHER PUBLICATIONS

Translation of claims of Sick AG (DE 202011052106), created Oct. 19, 2023, 6 pages. (Year: 2023).*
Office Action dated Aug. 21, 2020 issued in corresponding German Application No. 102019129986.1.
Aikio, et al., "Omnidirectional camera", IEEE 9th International Conference on Intelligent Computer Communication and Processing (ICCP), pp. 217-221, 2013.
Song, et al., "Calibration of Event-based Camera and 3D LiDAR", Proceedings of the 1st WRC Symposium on Advanced Robotics and Automation, pp. 289-295, 2018.
Gallego, et al., "A Unifying Contrast Maximization Framework for Event Cameras, with Applications to Motion, Depth, and Optical Flow Estimation", IEEE Conference on Computer Vision and Pattern Recognition (CVPR), 2018.
Gimkiewicz, et al., "Ultra-Miniature Catadioptrical System for an Omnidirectional Camera", Proc. of SPIE, vol. 6992, 2008.
Mayra, et al., "Fisheye optics for omnidirectional stereo camera", IEEE, 2015.
Pandey, et al., "Extrinsic Calibration of a 3D Laser Scanner and an Omnidirectional Camera", IFAC Proceedings, vols. 43.16, pp. 336-341, 2010.
Prophesee Metavision for Machines, White Paper, www.prophesee.ai.
Scaramuzza, et al., "Extrinsic Self Calibration of a Camera and a 3D Laser Range Finder from Natural Scenes", Intelligent Robots and Systems, IROS 2007.
Wu, et al., Neuromorphic vision chips, Science China, vol. 61, 2018.
Park, et al., Calibration between Color Camera and 3D LIDAR Instruments with a polygonal Planar Board, Sensors, vol. 14, pp. 5333-5353, 2014.
Lee, et al., "People Tracking and Target Following Method for an Outdoor Mobile Robot with LRF and Omni-Directional Camera", No. 12-3 Proceedings of the 2012 JSME Conference on Robotics and Mechatronics, 2012.
Song, et al., "Calibration of Event-based Camera and 3D LiDAR", Proceedings of the 1st WRC Symposium on Advanced Robotics and Automation, 2018.

* cited by examiner

OPTOELECTRONIC SENSOR AND METHOD OF DETECTING OBJECTS

The invention relates to an optoelectronic sensor and to a method of detecting objects in a monitored zone using a laser scanner and a panorama camera.

In a laser scanner, a scan beam or scanning beam scans a region and evaluates the remitted or reflected light. Not only the presence of objects, but simultaneously also their distances are usually determined in order to also obtain information on object distances, contours, or profiles. Such distance-measuring laser scanners work in accordance with a time-of-flight principle in which the transit time from the scanner to the scene and back is measured and distance data are calculated based on the speed of light. Two types of the time-of-flight method are widely used. In phase-based methods, the light transmitter modulates the scanning beam and the phase between a reference and the received scanning beam is determined. Pulse-based methods impart a significant pattern to the scanning beam, for example a narrow pulse of a duration of only a few nanoseconds, and determine the time of reception of this pattern. In a generalization designated as a pulse averaging method, a plurality of pulses or a pulse sequence is/are transmitted and the received pulses are statistically evaluated.

Laser scanners have a rotating mirror or polygon mirror wheel to periodically scan a monitored plane or a segment of a monitored plane. Alternatively, an active measurement head having a light transmitter and a light receiver rotates. 3D laser scanners detect a three-dimensional spatial zone and not only a surface. This can be implemented by a movement about a further axis, whether in a pivot movement or in a complete rotational movement. In DE 10 2008 032 216 A1, for example, the total scanning unit together with the transmitter, the receiver and the rotating mirror is arranged on a deflection plate. EP 1 965 225 A2 discloses the most varied possibilities of combining the rotational movement of a laser scanner with an additional tilting movement.

Multilayer laser scanners, which have a plurality of scanning beams arranged in elevation above one another, are furthermore known. For example, it is known from U.S. Pat. No. 8,767,190 B2 to provide a respective separate light transmitter and light receiver for a plurality of scanning planes so that the individual scanning planes can be adjusted in a desired height grid or elevation grid. US 2017/0289524 A1 discloses an optical system for detecting distance information in which a series arrangement of light sources is provided at the transmission side and an image sensor is provided at the reception side behind a large reception lens having an aperture array.

Cameras represent an alternative possibility of optically obtaining information. They usually have a much narrower field of view compared to laser scanners that detect an angle of up to 360°. A wider field of view up to likewise a 360° all-round view can be achieved by using a panorama optics. The paper by Mayra, Aki, Mika Aikio, and Matti Kumpulainen, "Fisheye optics for omnidirectional perception." 2014 IEEE 10th International Conference on Intelligent Computer Communication and Processing (ICCP). IEEE, 2014, uses a fisheye optics. Alternatively, catadioptric objectives are also used, for instance, in "Omnidirectional camera.", Aikio, Mika, Jukka-Tapani Mäkinen, and Bo Yang, 2013 IEEE 9th International Conference on Intelligent Computer Communication and Processing (ICCP), IEEE, 2013, or in "Ultra-miniature catadioptrical system for an omnidirectional camera.", Gimkiewicz, Christiane, et al, Micro-Optics 2008, Vol. 6992, International Society for Optics and Photonics, 2008.

In principle, such panorama cameras can also generate depth values themselves, i.e. they can be configured as 3D cameras. WO 2012/038601 A1, for example, presents a stereo camera having omnidirectional objectives, A respective camera in accordance with the time-of-flight principle having an omnidirectional objective is described in DE 20 2006 014 939 U1, DE 20 2011 052 106 U1, or EP 2 354 806 A1.

None of these systems can generate all-round satisfactory 3D image data. The point clouds of a laser scanner typically have a lower resolution in the vertical direction than horizontally. Stereo cameras are indeed able to detect smaller objects both horizontally and vertically, but they have a comparatively low depth resolution due to their operating principle. Cameras based on the time of flight and having panorama optics are indeed discussed on paper, but they still have to prove their value in practice.

Therefore, there is the approach of combined systems. While the laser scanner is used to scan the geometry of a scene, the camera can detect the visual impression of the scene and can thus detect properties such as lighting, materials, or textures. Alternatively, it is conceivable to also generate 3D data using the camera so that the two systems complement one another with respect to the geometry detection.

However, this is associated with a considerable effort for the calibration and the subsequent data fusion. For this purpose, the so-called extrinsic must be known, that is the transformation between the optical center of the laser scanner and the camera. This transformation generally comprises the translation in three spatial dimensions and the three angles of rotation in space and therefore has six degrees of freedom. The determination of the transformation is called extrinsic calibration. This can also be described as determining the conversion rule between the respective local coordinate systems or into a global coordinate system, for which the term registration is also common.

In the paper by Pandey, Gaurav, et al, "Extrinsic calibration of a 3d laser scanner and an omnidirectional camera." IFAC Proceedings, Volumes 43.16 (2010): 336-341, a precisely defined chessboard is used that has to be viewed from different perspectives. The camera system is additionally equipped with a plurality of optical channels.

According to the article by Park, Yoonsu, et al., "Calibration between color camera and 3D LIDAR instruments with a polygonal planar board." Sensor 14.3 (2014): 5333-5353, a precisely defined diamond-shaped object is used as a calibration target instead of a chessboard. An exactly defined calibration object can be difficult to obtain or can only be obtained at high costs or it is not available exactly when it is required, for example, during a measurement campaign. In addition, only a part section of the scanning zone is detected by the camera in this case.

In "Extrinsic self calibration of a camera and a 3d laser range finder from natural scenes.", Scaramuzza, Davide, Ahad Harati, and Roland Siegwart, Intelligent Robots and Systems, 2007. IROS 2007. IEEE/RSJ International Conference on IEEE, 200, a calibration object is indeed not used. For this purpose, correspondences have to be manually defined that are used for a transformation estimation, which requires a lot of time and is also defective depending on experience.

DE 10 2017 109 039 A1 deals with the fusion of a camera and a laser scanner. In this respect, the remission is also detected by the laser scanner in addition to its 3D measurement points and the mutual calibration takes place by a comparison of this remission image with the camera image. An extrinsic calibration of a camera and of a laser scanner is known from GB 2507560 A, wherein the task is additionally made more difficult here by the fact that the system is in motion and the movement paths are also reconstructed from the detected measurement data with the calibration. In US 2016/0070981 A1, for the fusion of a camera and a laser scanner, reference data of the laser scanner are first localized on a vehicle on the basis of the movement path and are then localized in the camera image. In all these examples, the camera is not a panorama camera.

Panorama images and depth data are detected and combined in US 2018/0139431 A1. The panorama images are in this respect produced by moving the camera or a plurality of cameras arranged all around. CN 105678783 B describes a complex calibration model for an arbitrary arrangement of a panorama camera and of a laser scanner. Due to the numerous degrees of freedom, the calibration is only possible with a great effort.

An innovative camera technology has recently been developed, the so-called result-based or event-based camera that is also called neuromorphic based on the visual cortex. A conventional camera exposes all its pixels at a regular frame repetition rate and then reads them out at the same time to thus obtain a number of stationary two-dimensional images per time period considered that corresponds to the frame repetition rate. In an event-based camera, there is likewise a matrix of pixels, but neither a fixed frame repetition rate nor a common readout of pixels. Instead, each pixel individually checks whether it determines a change in the intensity. A piece of image information is only output or read out in this case, and indeed only from this pixel. Each pixel is thus a kind of independent motion detector. A detected movement is individually reported as an event. The event-based camera thereby reacts extremely quickly to the dynamics in the scene. The image data cannot be intuitively detected for the human eye since the static image portions are absent, but it can offer advantages in machine evaluations.

The paper by Wu, Nanjian, "Neuromorphic vision chips." Science China Information Sciences 61.6 (2018): 060421, provides an overview in this respect. For example, an event-based camera is described in a white paper by the company Prophesee that can be downloaded from its website. Pixel circuits for an event-based camera are respectively known from WO 2015/036592 A1, WO 2017/174579 A1, and WO 2018/073379 A1. The paper by Gallego, Guillermo, Henri Rebecq, and Davide Scaramuzza, "A unifying contrast maximization framework for event cameras, with applications to motion, depth, and optical flow estimation", IEEE Int. Computer. Vis. Pattern Recog. (CVPR), Vol. 1. 2018, presents methods for how movement, distances and optical flow can be determined from the data of an event-based camera. US 2013/0335595 A1 discloses an apparatus and a method for an event-based image processing, specifically for determining the optical flow that is of no particular importance in connection with the reading of codes.

An event-based image sensor has its advantages, but in this respect only replaces a conventional 2D image sensor and thus initially does not contribute in any way to an improved 3D detection or even specifically to a fusion of a laser scanner and a panorama camera.

It is therefore an object of the invention to simplify the combination of a laser scanner with a camera.

This object is satisfied by an optoelectronic sensor and by a method of detecting objects in a monitored zone using a laser scanner and a panorama camera in accordance with the respective independent claim. The two mutually combined systems laser scanner and panorama camera have an arbitrary design per se that is known per se. The laser scanner transmits one or more scanning beams that are periodically guided over a scanning plane by a rotation of a deflection unit about an axis of rotation or possibly also a pivoting to and fro about the axis of rotation. The scanning beams are received again and the time of flight is measured. With this distance, the azimuth angle from the angular position of the deflection unit, and the elevation angle from the known irradiation direction of the respective scanning beam, 3D measurement points result. The panorama camera, on the other hand, comprises a panorama optics and an image sensor having a plurality of light reception elements or pixels. Thanks to the panorama optics, picture elements can be reached over a large angular range of at least 90° or even 180° up to 360°. The angular ranges of the laser scanner and of the panorama optics preferably at least approximately coincide.

A control and evaluation unit fuses the 3D measurement points of the laser scanner and the picture elements of the panorama camera. The respective measurement values are therefore associated with one another or are converted into a common coordinate system, if necessary with additional steps such as interpolation for filling gaps or smoothing in the original data and/or the fused data. Depth values or a geometric structure are thereby, for example, superposed by remission measurement values or the texture of the scene. This requires an (extrinsic) calibration; the control and evaluation unit therefore has to know corresponding transformations or parameters for determining the transformation, whether through the fixed mechanical design, an input of corresponding parameters, or a calibration phase. Depending on the embodiment, the control and evaluation unit is implemented as one or more function blocks in a laser scanner, in a panorama camera, or in a system connected thereto.

The invention starts from the basic idea of arranging the laser scanner and the panorama camera on the same axis. The sensor is designed such that the axis of rotation of the laser scanner and the optical axis of the panorama camera are identical, i.e. are disposed on the same straight line. The optical axis of the panorama camera is in particular the symmetry axis of the panorama optics.

The invention has the advantage that particularly high-quality detection data are obtained by a fusion of the laser scanner and the camera at a scanning angle or an azimuth angle of up to 360°. The vertical, but also the lateral resolution of the laser scanner can in particular be refined by the camera. A safer, faster and more accurate object recognition and object tracking is thereby possible than with already known technical solutions. The camera has only one optical channel and thus nevertheless detects the scan field of the laser scanner as completely as possible. Due to the special design on a common axis, a comparatively simple system is achieved and the calibration is very considerably simplified in so doing. A complex calibration model is not necessary.

The panorama camera is preferably configured as a time-of-flight camera. 3D points are thereby also detected by the panorama camera, in addition to or as a complement to its color value image data or gray value image data. In this way, the 3D measurement points of the laser scanner are validated or 3D points having a higher resolution are obtained overall.

The image sensor is preferably arranged on the axis of rotation and is in particular oriented perpendicular to the axis of rotation and/or centered about the axis of rotation. This results in a rotationally symmetrical arrangement also of the actual detection of the picture elements that further simplifies the design and the calibration. However, a possible offset or a slanted position of the image sensor could alternatively also be compensated by means of calibration.

The control and evaluation unit is preferably configured to associate at least one angular position of the deflection unit with light reception elements on a radial line of the image sensor. An association of the scanning angle of the laser scanner and the azimuth angle of the panorama camera thereby takes place; an agreement on common angular coordinates with respect to a rotation about the axis of rotation therefore takes place. The angular position is in particular a zero position, but other or further angular positions are also conceivable in order to determine and secure said association. The origin or the reference point is preferably the piercing point of the axis of rotation through the image sensor, wherein translations of the common world coordinates along the axis of rotation or in any other direction naturally remain possible.

For the understanding of the association specifically with a radial line on the image sensor, it has to be explained that the scanning planes of the laser scanner are each imaged as a concentric circular ring around the piercing point of the axis of rotation by the image sensor. Each radius starting from the piercing point in turn corresponds to a fixed azimuth angle or scanning angle. This identity of the azimuth angle and scanning angle is the result of the design with a coinciding axis of rotation and optical axis. Therefore, only a zero position or an angle of 0° has to be calibrated, wherein they are naturally only names for a common reference angle. The zero position is in turn determined by the geometrical design so that with a fixed, adjusted arrangement of the image sensor and an angle of 0° of the laser scanner, an actual calibration can be dispensed with since it takes place through the assembly. The zero position can, however, also be factory calibrated or it can be taught in that the laser scanner remains in its zero position and the control and evaluation unit localizes the illuminated pixels on the image sensor and remembers the corresponding radius as the zero position of the azimuth angle.

The control and evaluation unit is preferably configured to associate light reception elements at a radial distance from the optical axis with a scanning beam. Due to the special design of the sensor, this is the only degree of freedom, in addition to the azimuth angle and the scanning angle, which still has to be calibrated and at which a respective scanning beam is associated with a specific one of the concentric circles, i.e. with a radial distance from the piercing point, at a specific object distance corresponding to its azimuth angle. All of this is again determined by the geometry, in this case above all by the parallax that in turn depends on the mutual distance of the laser scanner and the panorama camera on the axis of rotation. Alternatively to a calculation of the calibration and to an adjusted assembly, a calibration process ex works or on site is conceivable. For this purpose, specific scanning beams of the laser scanner are activated and the concentric circular rings imaged on the image sensor are localized at a constant object distance. Their discrete order in the radial direction unambiguously corresponds to that of the arrangement above one another of the scanning beams in elevation.

The laser scanner and the panorama camera are preferably arranged directly above one another on the axis of rotation. The distance between the two systems is kept as small as possible to achieve a small parallax and 3D measurement points and picture elements that match one another as well as possible. A distance correction of the picture elements can take place in an unambiguous manner based on the respective distance information of the scan point, the distance between the laser scanner and the panorama camera, and the known imaging properties of the panorama optics in the radial direction. At this point, it is advantageous to design the panorama optics such that the radial position on the image sensor is as proportional as possible to the elevation angle, also in order to achieve a resolution that is as constant as possible over the total scanning range.

The control and evaluation unit is preferably configured to recognize a light spot generated on the image sensor by the scanning beam and to associate 3D measurement points and picture elements with one another on the basis of said light spot. This even enables a dynamic calibration or a tracking of the calibration in operation, in particular to also bring the time relationship of the respective measurement data into a particularly precise agreement.

The image sensor is preferably an event-based image sensor. Such event-based or neuromorphic image sensors were briefly introduced in the introduction. They are particularly well-suited, moving or rapidly changing scenes as in the case of mobile applications of the sensor.

In this respect, the light reception elements are preferably configured to determine when the intensity detected by the respective light reception element changes and to exactly then deliver a piece of image information in an event-based manner. The light reception element checks whether the detected intensity changes. Only this is an event and a piece of image information is only output or read out in the case of an event. A kind of hysteresis is conceivable in which the light reception element still ignores a defined, too slight change of the intensity and does not perceive it as an event.

The respective light reception element preferably delivers, as image information, a piece of differential information as to whether the intensity has decreased or increased. The information read from the light reception element is therefore, for example, a sign +1 or −1 depending on the direction of change of the intensity. In this respect, a threshold can be set for intensity changes up to which the light reception element does not yet trigger an event. In a subsequent internal representation for further evaluation, the value 0 can be added for times at which no event was detected.

The respective light reception element preferably delivers, as image information, an integrated intensity in a time window defined by a change of the intensity. Here, the information is not limited to a direction of the intensity change, but the incident light is rather integrated in a time window defined by the event and a gray value is thereby determined. The measurement value thus corresponds to that of a conventional camera, but the point in time of the detection remains event-based and is coupled to an intensity change.

The respective light reception element preferably outputs image information with an update frequency of at least one KHz or even at least ten KHz. The update frequency of a conventional camera is the frame repetition rate or the frame rate. An event-based camera does not know such a common frame repetition rate since the light reception elements output or refresh their image information individually and in an event-based manner. However, there are extremely short response times in this respect that would only be achievable by a conventional camera at immense costs with a thousand or more images per second; this could technically no longer be presented by conventional cameras with an event-based, still possible update frequency of ten KHz or even several ten KHz. This high time resolution also has the advantage that there are practically no motion artifacts (motion blur). Within one of the extremely short update periods, which corresponds to a conventional exposure time, an object does not move further by a plurality of pixels and therefore no blurred image is recorded either. The extremely fast recording is preferably used to detect the laser spot with a high time resolution and thus to achieve or track a highly accurate calibration.

Laser scanners and/or panorama cameras are preferably configured as modules that can be removed from the sensor or added to the sensor, wherein the control and evaluation unit is in particular configured to calibrate the laser scanner and the panorama camera with respect to one another on a subsequent addition of a module. Due to the modular design, a panorama camera or a laser scanner can subsequently also still be added at the operating site, if required. The calibration then, for example, takes place by triggering a teaching process. This is easily possible due to the design on a common axis. A conventional general calibration model, in contrast, would require calibration objects in the scene and a very complex calculation with a corresponding large amount of calibration data.

The method in accordance with the invention can be further developed in a similar manner and has similar advantages in this respect. Such advantageous features are described in an exemplary, but not exclusive, manner in the subordinate claims dependent on the independent claims.

The fusion in this respect preferably associates a scanning angle of the scanning unit with an azimuth angle on the image sensor and associates an elevation angle of the scanning beam with a radial distance from the axis of rotation on the image sensor. The imaging of scanning planes of the laser scanner onto concentric circular rings about the axis of rotation on the image sensor, which imaging underlies this simple calibration and conversion, was explained above: radii each simultaneously correspond to a fixed azimuth angle and a scanning angle and the radial distance of the respective circular rings is unambiguously associated with a specific scanning beam at a specific object distance.

The invention will be explained in more detail in the following also with respect to further features and advantages by way of example with reference to embodiments and to the enclosed drawing. The Figures of the drawing show in.

Figure 1:
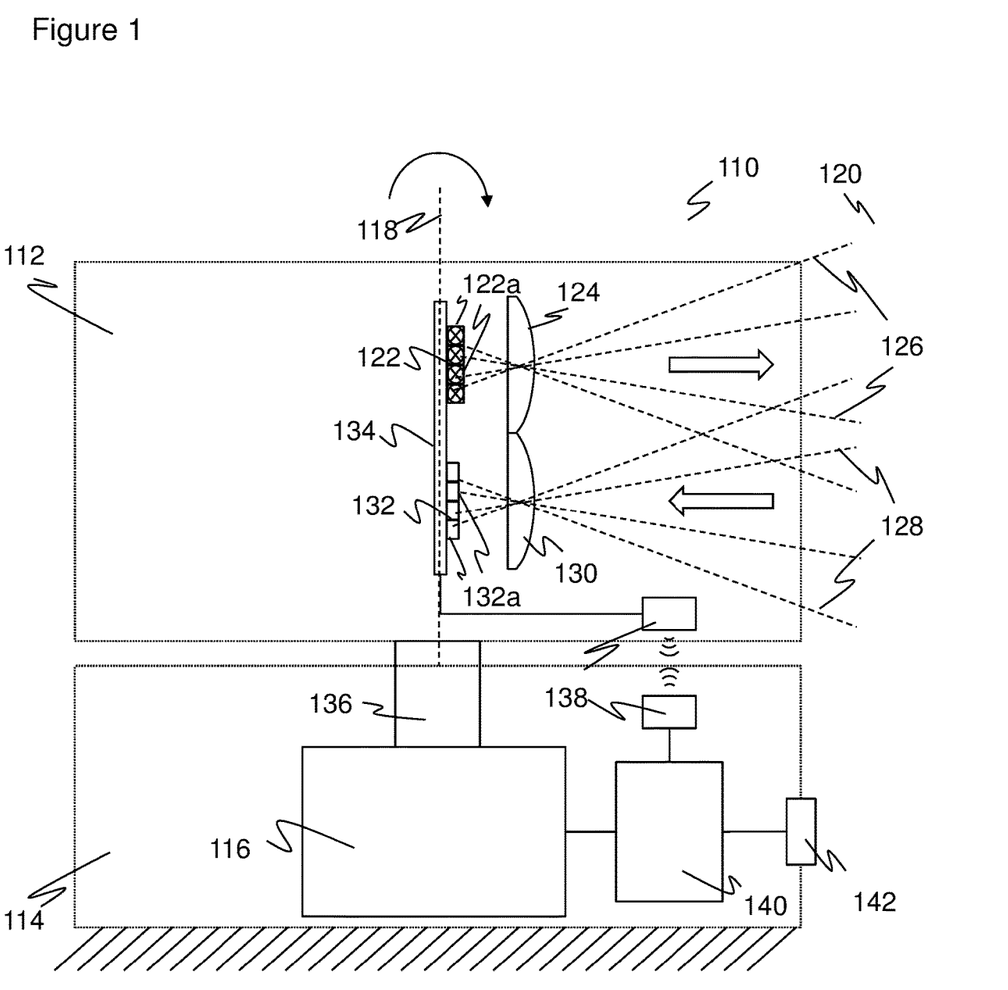
FIG. 1 a schematic sectional representation of a laser scanner.

FIG. 1 shows a schematic sectional representation through an exemplary laser scanner 110. The laser scanner 110 comprises a movable scanning unit 112 and a base unit 114 in a rough distribution. The scanning unit 112 is the optical measurement head, whereas further elements such as a supply, evaluation electronics, terminals and the like are accommodated in the base unit 114. In operation, the scanning unit 112 is set into a rotational movement about an axis of rotation 118 with the aid of a drive 116 of the base unit 114 to thus periodically scan a monitored zone 120.

In the scanning unit 112, a light transmitter 122 having a plurality of light sources 122*a*, for example LEDs or lasers in the form of edge emitters or VCSELs, with the aid of a common transmission optics 124 generates a plurality of transmission light beams 126 having a mutual angular offset that are transmitted into the monitored zone 120. The plurality of transmission light beams 126 can alternatively be produced via fewer or only one light source and via at least one beam splitter element or pattern generation element. The number of four transmission light beams 126 is only an example; there can be more or fewer or only one single transmission light beam.

If the transmission light beams 126 are incident onto an object in the monitored zone 120, corresponding remitted light beams 128 return to the laser scanner 110. The remitted light beams 128 are guided by a reception optics 130 to a light receiver 132 having a plurality of light reception elements 132*a* that each generate an electrical reception signal. The light reception elements 132*a* can be separate components or pixels of an integrated matrix arrangement, for example, photodiodes, APDs (avalanche diodes), or SPADs (single-photon avalanche diodes).

In the embodiment shown in FIG. 1, the light transmitter 122 and the light receiver 132 are jointly arranged on a circuit board 134 that lies on the axis of rotation 118 and that is connected to the shaft 136 of the drive 116. This can only be understood by way of example; practically any desired numbers and arrangements of circuit boards are conceivable. The basic optical design having a light transmitter 122 and a light receiver 132 biaxially disposed next to one another is also not compulsory and can be replaced by any construction shape known per se from single-beam optoelectronic sensors or laser scanners. A coaxial arrangement with or without a beam splitter is an example of this.

A contactless supply and data interface 138 connects the movable scanning unit 112 to the stationary base unit 114. A distance measurement unit 140 is located there that can at least partly also be accommodated on the circuit board 134 or at another location in the scanning unit 112. The distance measurement 140 controls the light transmitter 122 and receives the reception signals of the light receiver 132 for a further evaluation. It additionally controls the drive 116 and receives the signal of an angular measurement unit that is not shown, that is generally known from laser scanners, and that determines the respective angular position of the scanning unit 112.

For the evaluation, the distance from a sensed object is preferably measured using a time-of-flight method known per se. Together with the information on the angular position from the angular measurement unit, two-dimensional polar coordinates of all the object points in a scanning plane are available after every scanning period with angle and distance. The respective scanning plane is likewise known via the identity of the respective remitted light beam 128 and its detection in one of the light reception elements 132*a* so that a three-dimensional spatial zone is scanned overall. The object positions or object contours are thus known and can be output via a sensor interface 142, for example as a 3D point cloud. The sensor interface 142 or a further terminal, not shown, conversely serves as a parameterization interface.

The laser scanner 110 shown has a rotating measurement head, namely the scanning unit 112. In this respect, not only a transmission-reception module can rotate along as shown here, but further such modules having a height offset or an angular offset with respect to the axis of rotation 118 are conceivable. Alternatively, a periodic deflection by means of a rotating mirror or a facet mirror wheel is also conceivable. This requires additional considerations since how the plurality of transmission light beams 126 are incident into the monitored zone 120 depends on the respective rotational position. They so-to-say rotate around one another with the movement of the rotating mirror, but in a predictable manner that can therefore be compensated in the 3D measurement points.

During the rotation of the laser sensor 120, a respective surface is scanned by each of the transmission light beams 126. A plane of the monitored zone 120 is in this respect only scanned at a deflection angle of 0°, that is with a horizontal transmission light beam not present in FIG. 1. The remaining transmission light beams scan the jacket surface of a cone that is designed as differently acute depending on the deflection angle. With a plurality of transmission light beams 126 that are deflected upwardly and downwardly at different angles, a kind of nesting of a plurality of hourglasses arises as a scanned structure overall. These conical jacket surfaces are here also sometimes called scanning planes in simplified terms.

Figure 2:
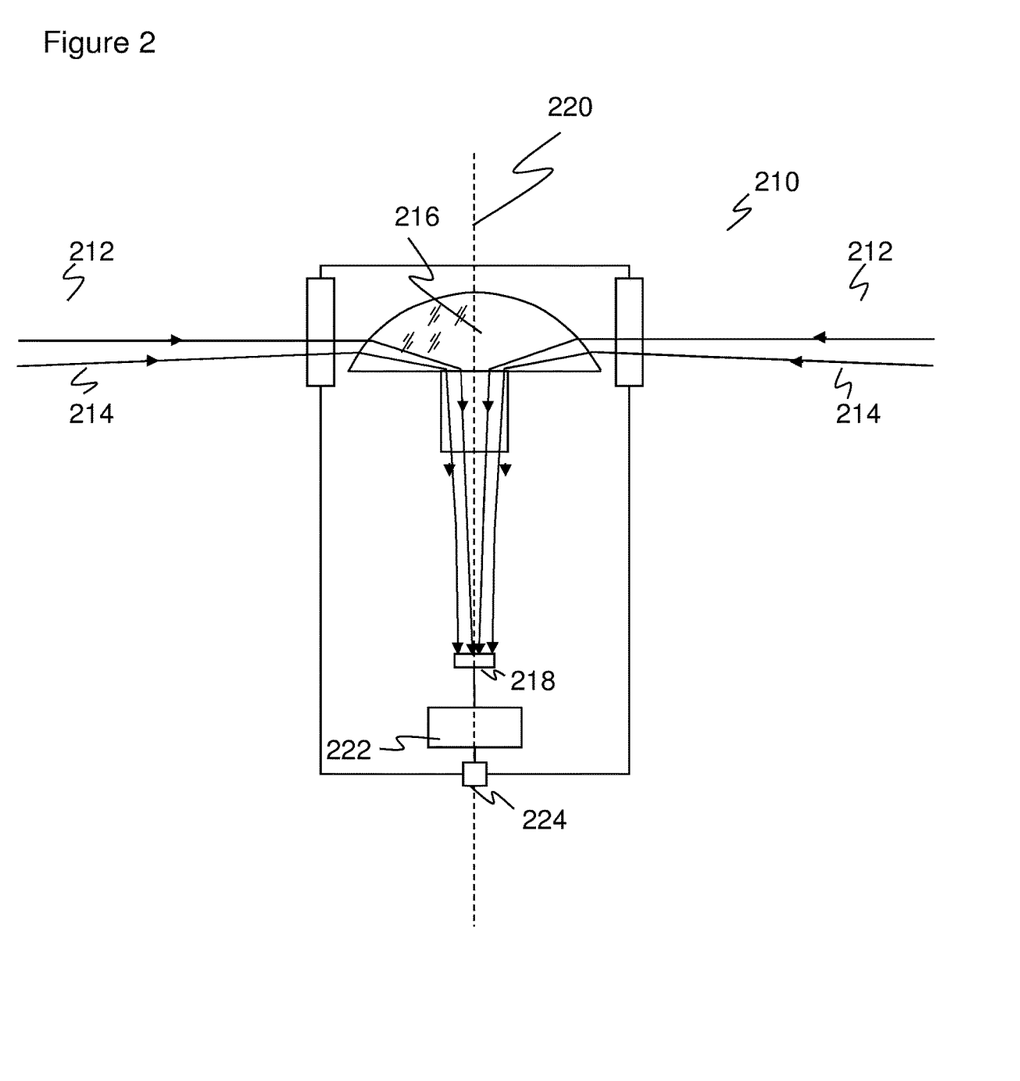
FIG. 2 a schematic sectional representation of a panorama camera.

FIG. 2 shows a sectional representation of an exemplary panorama camera 210. Reception light 214 is guided via a panorama optics 216 from the monitored zone 212 thereof to an image sensor 218. The panorama optics can record light over a large azimuth angular range of up to 360°. It is, for example, configured as a fisheye or as a catadioptric or omnidirectional optics, for example. A few specific implementation options were cited in the introduction.

The image sensor 218 is preferably perpendicular to the symmetry axis 220 of the panorama camera 210 or of the panorama optics 216, and again preferably such that the piercing point of the symmetry axis 220 is disposed at the center of the image sensor 218. In addition to embodiments as a CCD or CMOS matrix comprising pixels for color or monochrome recordings, embodiments as an event-based or neuromorphic image sensor mentioned in the introduction are also possible. Due to this extremely fast detection of up to 50 KHz and more, such an event-based image sensor is particularly suitable for a fast and continuous object tracking. This particularly advantageously complements the comparatively slow repetition rate of a laser scanner 110 at typical rotational frequencies of 50 Hz in the sense of a time diversity. In the combination system of the laser scanner 110 and the panorama camera 210 still to be described, the spots of the moving transmission light beams 126 can be recorded with a high time resolution so that a time association of the measurement points of the two systems 110, 210 with the high time resolution of the event-based image sensor becomes possible.

The position of a respective pixel of the image sensor 218 carries along position information of the respective detected object point, namely the azimuth angle in the angular direction around the piercing point of the symmetry axis 220 and the elevation angle in the radial direction. This will later be explained even more precisely with reference to FIGS. 3 and 4.

An image readout unit 222 is connected to the image sensor 218 and outputs the detected picture elements via an output 224. In an alternative embodiment, the panorama camera has an additional lighting that is, for example, coaxially coupled into the beam path of the panorama optics 216 with the aid of a beam splitter or that has its own panorama optics. Thus, the image readout unit 222 can then be extended and can also measure a time of flight through a corresponding modulated lighting. In practice, such a 3D panorama camera will often already carry out the time-of-flight measurement or at least a preparatory demodulation in the pixels of the image sensor 218 so that the separation into two separate components 218, 222 as in FIG. 2 is then at least partly canceled. With a 3D panorama camera, 3D picture elements are generated in addition to or instead of color value picture elements or gray value picture elements for the fusion to be described immediately.

Figure 3:
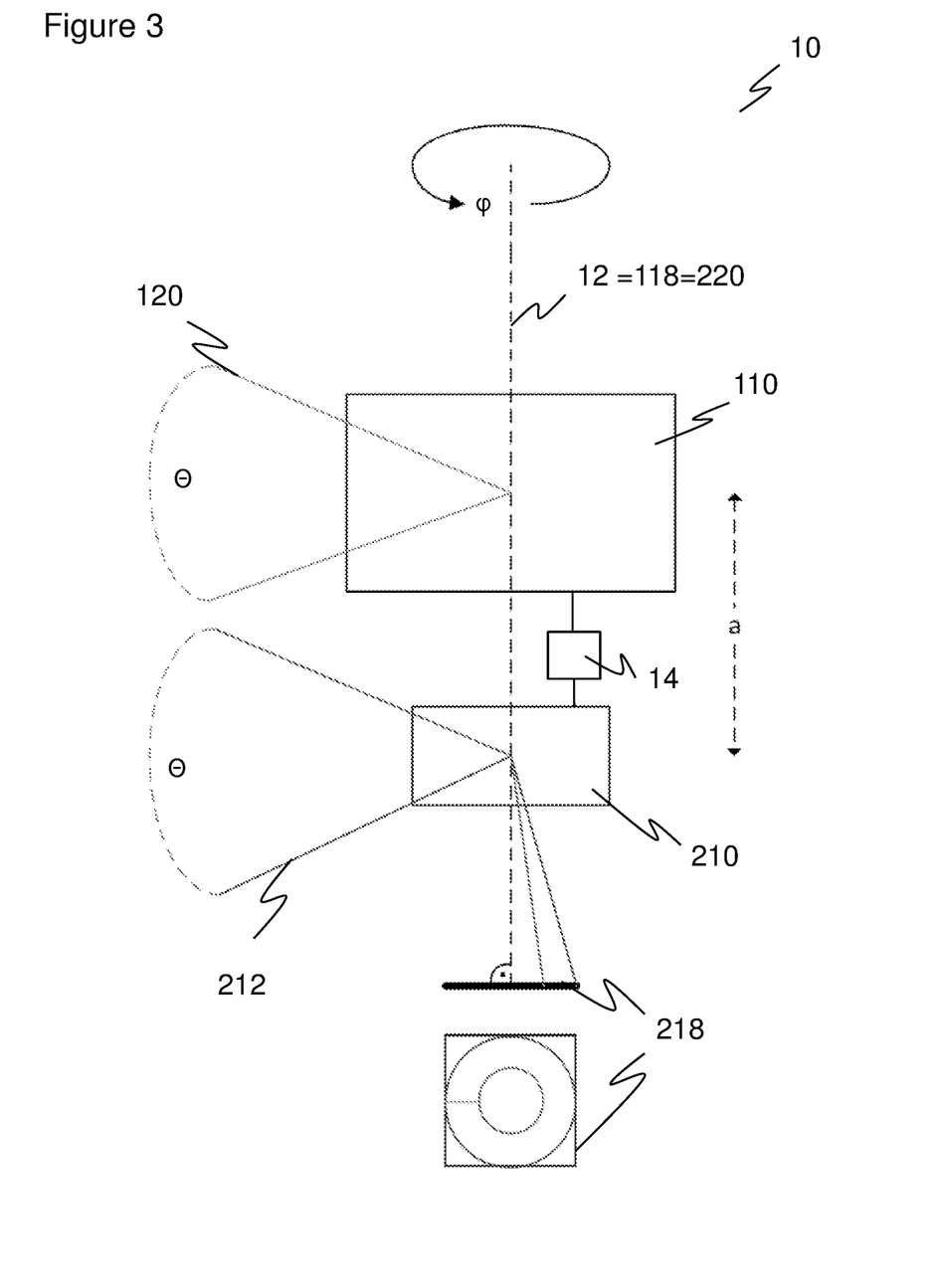
FIG. 3 a schematic sectional representation of an optoelectronic sensor as a combination of a laser scanner and a panorama camera.

FIG. 3 shows a schematic sectional representation of an optoelectronic sensor 10 as a combination of a laser scanner 110 and a panorama camera 210. The two individual systems laser scanner 110 and panorama camera 210 can be designed in one of the ways described or in any other way known per se. From now on, they are only shown as function blocks in a purely symbolic manner. A fusion and further processing of the respective measurement data can take place distributed in practically any desired manner over a distance measurement unit 140 of the laser scanner 110, an image readout unit 222 of the panorama optics, a common data processing unit 14, and/or a connected further system such as a higher-ranking control or even a cloud.

The laser scanner 110 and the panorama camera 210 are integrated into the jointly formed sensor 10 such that the axis of rotation 118 of the laser scanner 110 and the symmetry axis 220 coincide in a common axis 12. The mechanical coupling is therefore such that the axis of rotation 118 and the symmetry axis 220 are identical or the image sensor 218 is perpendicular to the axis of rotation 118 of the laser scanner 110. The extrinsic calibration and thus also the association between the 3D measurement points of the laser scanner 110 and the picture elements of the panorama camera 210 is thereby very considerably simplified.

This is first due to the fact that only a total of two systems have to calibrated due to the use of a panorama camera 210. Due to the specific design of the sensor 10, both the scanning angle of the rotational movement of the laser scanner 110 and the azimuth angle of the panorama camera are furthermore described by the common angle $\varphi$. Only an agreement on the zero position is absent here. The respective height angles or elevation angles $\Theta$ can likewise be easily associated with a radial distance. This is sketched below in FIG. 3 in a plan view of the image sensor 218.

Figure 4:
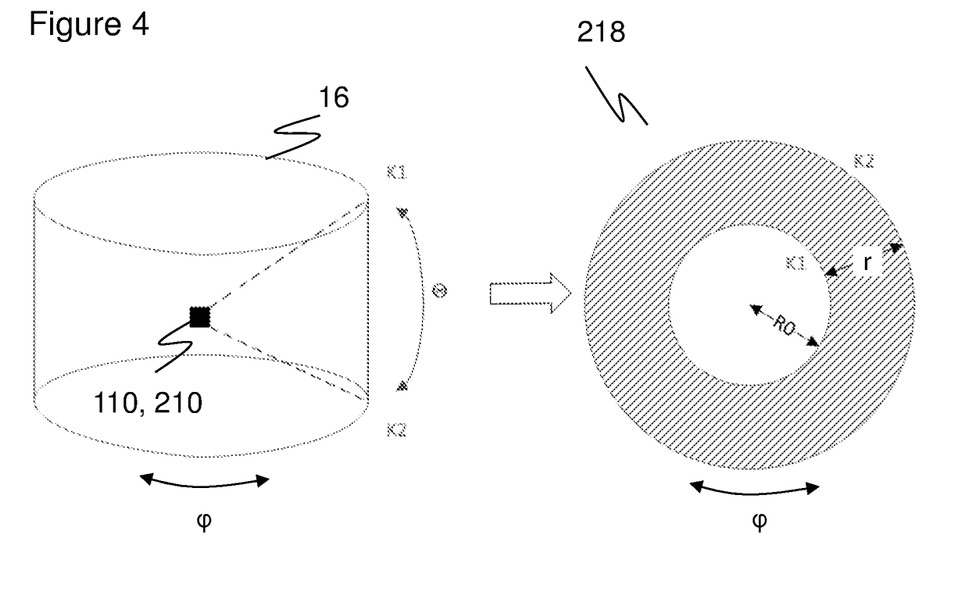
FIG. 4 a representation of the field of view of the sensor in accordance with FIG. 3 and the image of the field of view on the image sensor of the panorama camera.

This sketch is shown enlarged again at the right in FIG. 4. At the left, the sensor 10 is again shown there with its common monitored zone 16, wherein the respective monitored zones 120, 212, which appear separately very close to the system with a large display scale in FIG. 3, preferably overlap as completely as possible in this common monitored zone 16. This is supported when the mutual distance a is selected as small as possible on the common axis 12. A large angular range of at least 90°, at least 180°, or even 360°, or a matching intermediate value such as 270° is detected in the azimuth direction $\varphi$ in each case.

At the right in FIG. 4, it can be seen how the common monitored zone 16 is imaged onto a circular ring on the image sensor 218. The inner boundary circle having the radius K1 corresponds to a highest elevation angle; the outer boundary circle having the radius K2 corresponds to a lowest elevation angle. Object points at a fixed angle $\varphi$ are mapped onto a path r along the radius. Where this is, substantially depends on the parallax so that it is recommended to keep the distance a as small as possible. Accordingly, the scanning beams 126, 128 draw a circle having a radius between K1 and K2, corresponding to their respective elevation $\Theta$, during their scanning movement and scanning beams 126, 128 disposed above one another draw a path along a radius r with a fixed scanning angle.

The calibration can therefore be limited to the scanning angle and the azimuth angle being compared, for example with a common zero position, and the points along the path r being associated with the respective scanning beams 126, 128. These relationships are predefined by the geometry in the sensor 10 and can therefore be calculated. Alternatively, spots of the scanning beams 126, 128 are localized on the image sensor 218 with a stationary deflection unit 112 and/or circular rings are localized on the image sensor 218 during the periodic scanning movement. In particular on the use of an event-based image sensor 218, this is even dynamically possible in operation. A complex calibration model is no longer necessary.

The invention claimed is:

1. An optoelectronic sensor for detecting objects in a monitored zone, wherein the optoelectronic sensor comprises:
   a laser scanner having a light transmitter, a light receiver, and a deflection unit, wherein the deflection unit is rotatable about an axis of rotation for scanning the monitored zone with at least one scanning beam;
   a first distance measurement unit for determining, using a received signal of the light receiver, three-dimensional (3D) measurement points of the respective objects impacted by the scanning beam using a time-of-flight method;
   a panorama camera having panorama optics and having an image sensor with a plurality of light reception elements for detecting picture elements; and
   a control and evaluation unit that is configured to transform the 3D measurement points of the laser scanner and the picture elements of the panorama camera into a common coordinate system and fuse the transformed 3D measurement points of the laser scanner and the transformed picture elements of the panorama camera in the common coordinate system,
   wherein an optical axis of the panorama camera and the axis of rotation coincide.

2. The optoelectronic sensor in accordance with claim 1, wherein the panorama camera is configured as a time-of-flight camera.

3. The optoelectronic sensor in accordance with claim 1, wherein the image sensor is arranged on the axis of rotation.

4. The optoelectronic sensor in accordance with claim 3, wherein the image sensor is oriented perpendicular to the axis of rotation and/or centered about the axis of rotation.

5. The optoelectronic sensor in accordance with claim 1, wherein the control and evaluation unit is configured to associate at least one angular position of the deflection unit with light reception elements on a radial line of the image sensor.

6. The optoelectronic sensor in accordance with claim 1, wherein the control and evaluation unit is configured to associate light reception elements at a radial distance from the optical axis with a scanning beam.

7. The optoelectronic sensor in accordance with claim 1, wherein the laser scanner and the panorama camera are arranged directly above one another on the axis of rotation.

8. The optoelectronic sensor in accordance with claim 1, wherein the control and evaluation unit is configured to recognize a light spot generated on the image sensor by a scanning beam and to associate 3D measurement points and picture elements with one another on the basis of said light spot.

9. The optoelectronic sensor in accordance with claim 1, wherein the image sensor is an event-based image sensor.

10. The optoelectronic sensor in accordance with claim 9, wherein the light reception elements are configured to determine when the intensity detected by the respective light reception element changes and to exactly then deliver a piece of image information in an event-based manner.

11. The optoelectronic sensor in accordance with claim 10, wherein a respective light reception element delivers, as image information, a piece of differential information as to whether the intensity has decreased or increased and/or an integrated intensity in a time window defined by a change of the intensity.

12. The optoelectronic sensor in accordance with claim 1, wherein at least one of the laser scanner and the panorama camera is configured as a module that can be removed from the optoelectronic sensor or added to the optoelectronic sensor.

13. The optoelectronic sensor in accordance with claim 12, wherein the control and evaluation unit is configured to calibrate the laser scanner and the panorama camera with respect to one another on a subsequent addition of a module.

14. The optoelectronic sensor in accordance with claim 1, wherein the laser scanner and the panorama camera are arranged with a mutual offset.

15. The optoelectronic sensor in accordance with claim 1, wherein the control and evaluation unit that is further configured to perform calibration on the laser scanner and the panorama camera to establish the common coordinate system.

16. A method of detecting objects in a monitored zone, comprising:
   scanning the monitored zone with at least one scanning beam generated by a laser scanner, the laser scanner having a light transmitter, a light receiver, and a deflection unit, wherein the deflection unit is rotatable about an axis of rotation;
   determining three-dimensional (3D) measurement points of the respective objects impacted by the scanning beam using a received signal of the light receiver and a time-of-flight method;
   detecting the monitored zone using a panorama camera having panorama optics and having an image sensor with a plurality of light reception elements in order to obtain picture elements;
   transforming the 3D measurement points of the laser scanner and the picture elements of the panorama camera into a common coordinate system; and
   fusing the transformed 3D measurement points of the laser scanner and the transformed picture elements of the panorama camera in the common coordinate system,
   wherein an optical axis of the panorama camera and the axis of rotation coincide.

17. The method in accordance with claim 16, wherein the fusing associates a scanning angle of the scanning unit with an azimuth angle on the image sensor and associates an elevation angle of the scanning beam with a radial distance from the axis of rotation on the image sensor.

18. The method in accordance with claim 17, wherein the fusing further comprises imaging of scanning planes of the scanning unit onto concentric circular rings about the axis of rotation on the image sensor.

19. The method in accordance with claim 16, wherein the laser scanner and the panorama camera are arranged with a mutual offset.

20. The method in accordance with claim 16, further comprising performing calibration on the laser scanner and the panorama camera to establish the common coordinate system.

\* \* \* \* \*